(12) United States Patent
Ohmi

(10) Patent No.: US 7,907,631 B2
(45) Date of Patent: *Mar. 15, 2011

(54) ACCESS CONTROL METHOD AND SYSTEM

(75) Inventor: Shinichiro Ohmi, Toyono-gun (JP)

(73) Assignee: Panasonic Corporation, Osaka (JP)

( * ) Notice: Subject to any disclaimer, the term of this patent is extended or adjusted under 35 U.S.C. 154(b) by 780 days.

This patent is subject to a terminal disclaimer.

(21) Appl. No.: 11/783,060

(22) Filed: Apr. 5, 2007

(65) Prior Publication Data

US 2007/0189330 A1 Aug. 16, 2007

Related U.S. Application Data

(62) Division of application No. 10/849,004, filed on May 20, 2004, now Pat. No. 7,212,546.

(30) Foreign Application Priority Data

May 20, 2003 (JP) ................. 2003-142460

(51) Int. Cl.
*H04J 3/16* (2006.01)

(52) U.S. Cl. ..................................... 370/468

(58) Field of Classification Search ............ 370/468, 370/477, 232, 508, 235, 253, 236, 395.41, 370/230.1, 395.21, 395.4

See application file for complete search history.

(56) References Cited

U.S. PATENT DOCUMENTS

| | | | |
|---|---|---|---|
| 5,258,979 A | 11/1993 | Oomuro et al. | |
| 5,537,399 A | 7/1996 | Du | |
| 6,404,777 B1 * | 6/2002 | Hattori et al. | 370/468 |
| 6,657,958 B1 | 12/2003 | Tanaka | |
| 7,212,546 B2 * | 5/2007 | Ohmi | 370/468 |
| 2002/0018481 A1 | 2/2002 | Mor et al. | |

FOREIGN PATENT DOCUMENTS

| | | |
|---|---|---|
| EP | 0 297 629 | 1/1989 |
| EP | 1 056 244 | 11/2000 |
| EP | 1 292 054 | 3/2003 |
| JP | 7-212373 | 8/1995 |
| JP | 09-214459 | 8/1997 |
| JP | 2000-316035 | 11/2000 |
| JP | 2002-353974 | 12/2002 |
| JP | 2003-87283 | 3/2003 |

OTHER PUBLICATIONS

R. Tang et al., "Postman: Polling-Based Scheduling Strategy for Multiple Access Control in Wireless ATM Networks", IEICE Trans. Commun., vol. E82-B, No. 9, XP-000940269, Sep. 1999, pp. 1514-1521.

* cited by examiner

*Primary Examiner* — Chi H Pham
*Assistant Examiner* — Alexander Boakye
(74) *Attorney, Agent, or Firm* — Wenderoth, Lind & Ponack, L.L.P.

(57) ABSTRACT

An access control method applicable to a network including a plurality of communication terminals for achieving simplification in processing, improvement in response, and efficient use of bands is provided. In a terminal station, a transmission information generating section generates predetermined transmission information based on the amount of data stored in a buffer section. A packet transmitting section generates a packet including data and the transmission information for transmission to another terminal station. In a control station, a packet receiving section receives the packet transmitted by the terminal station. A transmission information obtaining section analyzes the received packet to obtain the transmission information and, based on the transmission information, determines whether the band currently allocated is to be changed. If a change is required, a packet transmitting section transmits a packet reporting a newly-allocated band to the terminal stations.

6 Claims, 8 Drawing Sheets

F I G. 3

| PHYSICAL LAYER HEADER | PACKET TYPE | RECIPIENT ADDRESS | ORIGINATOR ADDRESS | LINK IDENTIFI- CATION | PRIORITY | TRANSMISSION INFORMATION | TRANSMISSION DATA LENGTH | OPTION DATA | FCS | TRANSMISSION DATA | FCS | GUARD |

| RECIPIENT ADDRESS | ORIGINATOR ADDRESS | LINK IDENTIFICATION | PRIORITY | TRANSMISSION INFORMATION |
|---|---|---|---|---|
| abc | def | 0011 | 2 | 4500 |
| ghi | jkl | 0012 | 1 | 15000 |
| mno | pqr | 0023 | 3 | 5000 |
| | | | | |

| REQUESTED RATE (Mbps) | AMOUNT OF DATA (byte) |
|---|---|
| 1 | 1250 |
| 2 | 2500 |
| 6 | 7500 |
| 9 | 11250 |
| 1 2 | 15000 |
| 1 5 | 18750 |
| 1 8 | 22500 |

ACCESS CONTROL METHOD AND SYSTEM

This is a Rule 1.53(b) Divisional of Ser. No. 10/849,004, filed May 20, 2004 now U.S. Pat. No. 7,212,546

BACKGROUND OF THE INVENTION

1. Field of the Invention

The present invention relates to access control methods and systems. More specifically, the present invention relates to an access control method to be used in a communication system including a plurality of communication terminals for controlling a band to be used by each communication terminal for access based on a state of communication, and an access control system to which the access control method is applied.

2. Description of the Background Art

An example of a conventional technology for controlling a band to be used by a communication terminal based on a state of communication is disclosed in Japanese Patent Laid-Open Publication No. 2003-87283. In this conventional technology, controlling over a communication band in an upstream direction from a subscriber terminal to a host communication device is achieved by band allocation using a reservation protocol, for example.

In communication over a large-scale network, such as the Internet or a CATV system, traffic is managed in various manners by using the controller communication device, an access point, a gateway, or the like. In the near future, however, a home network is expected to become widespread, and therefore traffic management in a small-sized network is expected to become important.

In such a home network, terminals included in home electrical products, such as personal computers, televisions, and air conditioners, are expected to be directly connected to one another. Therefore, communication band management has to be readily performed among the terminals at high speed. However, application of conventional technologies for use in a large-scale network, such as a band allocation technology using a reservation protocol for a home network and a technology for data transmission from one terminal to another via a band control device typified by an access point or a gateway, makes the overall processing complex and the response and band usage inefficient.

Therefore, an object of the present invention is to provide an access control method and system using a scheme in which each communication terminal reports its state of communication to another communication terminal, thereby achieving simplification in processing, improvement in response, and efficient use of bands.

SUMMARY OF THE INVENTION

One aspect of the present invention is directed to an access control method to be used in controlling a communication band for access to a network in a time-division manner. The access control method of the present invention achieves the above object by causing the communication terminals to perform steps described below.

Of the plurality of communication terminals, a data transmitting communication terminal performs steps of: generating transmission information for specifying an amount of data stored in a transmission buffer; and transmitting a transmission packet added with the generated transmission information. Any one of the communication terminals performs steps of: obtaining transmission information of other communication terminals from the transmission packet transmitted on the network; and controlling communication bands allocated to the other communication terminals based on the obtained transmission information.

In the communication band controlling step, an unused band is allocated to a specific communication terminal in which the amount of stored data is more than an amount that can be processed in a band currently allocated. The unused band can be allocated to a plurality of the specific communication terminals in accordance with a ratio of a band currently allocated to each of the specific communication terminals. Also, the unused band can be allocated in accordance with a priority set in advance to each of the specific communication terminals. Furthermore, the unused band can be allocated in accordance with both of the ratio of the band currently allocated and the priority. Here, it is preferable that the unused band includes an extra band not required for processing the amount of data currently stored in the other communication terminals.

The access control method of the present invention achieves the above object also by causing the communication terminals to perform steps described below. Each of the communication terminals performs steps of: generating transmission information for specifying an amount of data stored in a transmission buffer; transmitting a transmission packet added with the generated transmission information; obtaining transmission information of other communication terminals from a transmission packet transmitted on the network; and determining a communication terminal's own frequency of transmission based on the generated transmission information and the transmission information of the other communication terminals.

In the determining step, the transmission terminal's own frequency of transmission can be determined based on a ratio of an amount of data stored in a communication terminal's own transmission buffer with respect to a total amount of data stored in the communication terminals. Also, the communication terminal's own frequency of transmission can be determined based on a relation between a communication terminal's own priority set in advance and priorities set in advance in the other communication terminals. Furthermore, the communication terminal's own frequency of transmission can be determined based on both of the above-stated ratio of the amount of data and the above-stated priority relation.

The above-described access control method can be achieved by hardware with a plurality of functional blocks. These functional blocks may be achieved by an LSI. Also, the access control method may be provided in a form of a program for causing a computer to perform a series of processes. This program may be introduced as being recorded on a computer-readable recording medium.

As described above, according to the present invention, a plurality of communication terminals each transmit transmission data added with transmission information indicative of the degree of the amount of data stored in the buffer. Then, the transmission information is analyzed for collectively controlling communication bands of all communication terminals or controlling a communication band of each communication terminal. With this, the band can be allocated in accordance with the retransmission process or fluctuations in traffic. Furthermore, the communication band can be efficiently used by avoiding band congestion.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustration for describing the structure of a packet frame.

DESCRIPTION OF THE PREFERRED EMBODIMENTS

Figure 1:
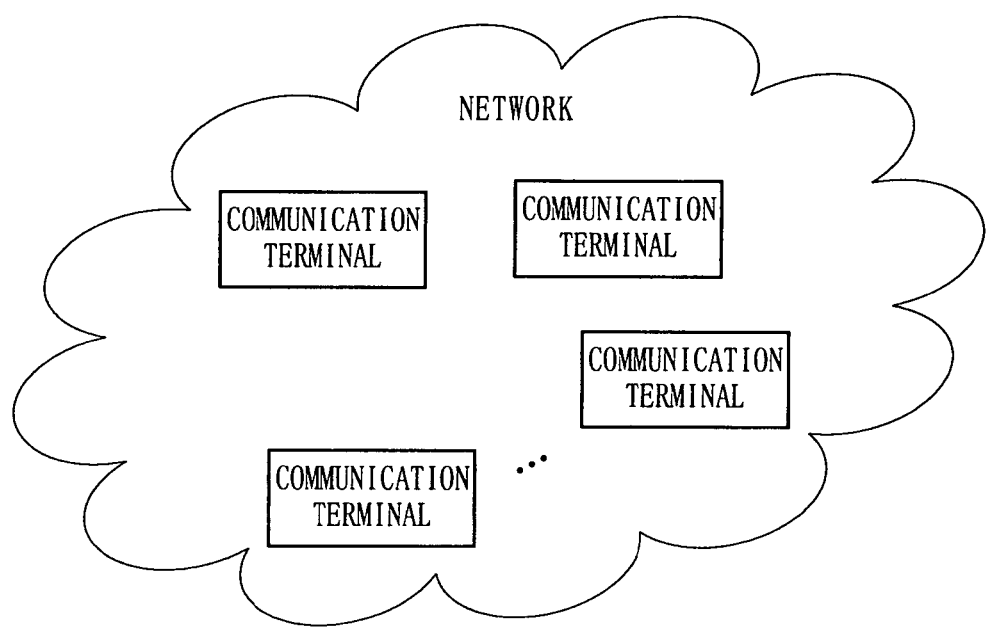
FIG. 1 is a schematic illustration for describing an access control system according to all embodiments of the present invention.

First, with reference to FIG. 1, a general outline of access control systems according to all embodiments of the present invention is described below. In FIG. 1, the access control system of the present invention includes a plurality of communication terminals for accessing a network. The communication terminals each have a unique identifier and, based on the identifier, communicate with each other in the network. Hereinafter, description is made to a scheme according to the present invention for controlling a communication band used by each of the communication terminals.

First Embodiment

Figure 2:
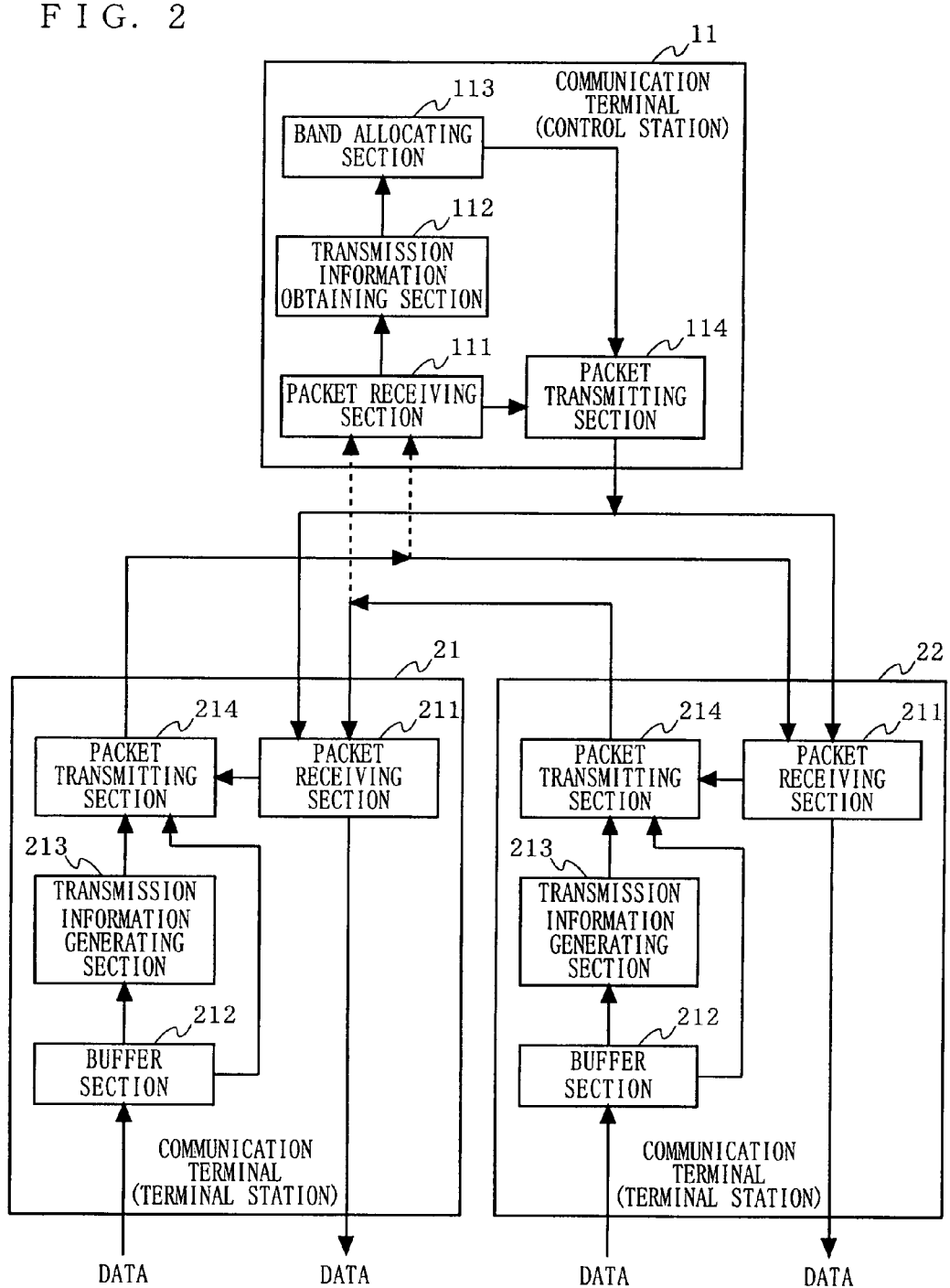
FIG. 2 is a detailed functional block diagram illustrating communication terminals forming an access control system according to a first embodiment of the present invention.

FIG. 2 is a detailed functional block showing the communication terminals forming an access control system according to a first embodiment of the present invention. The access control system according to the first embodiment includes communication terminals 21 and 22 for performing data communication (hereinafter denoted as terminal stations 21 and 22), and a communication terminal 11 for controlling these terminal stations 21 and 22 (hereinafter denoted as a control station 11). The control station 11 includes a packet receiving section 111, a transmission information obtaining section 112, a band allocating section 113, and a packet transmitting section 114. The terminal station 21 includes a packet receiving section 211, a buffer section 212, a transmission information generating section 213, and a packet transmitting section 214. The terminal station 22 has a structure identical to that of the terminal station 21. In FIG. 2, the number of terminal stations is exemplarily two. This is not meant to be restrictive, and the number of terminal stations may be more than two.

First, the structure of each of the control station 11 and the terminal stations 21 and 22 is schematically described below.

In the control station 11, the packet receiving section 111 receives a packet (which is equivalent to a frame) from each of the terminal stations 21 and 22. The transmission information obtaining section 112 obtains transmission information from the packet received by the packet receiving section 111. Based on the transmission information obtained by the transmission information obtaining section 112, the band allocating section 113 allocates a band to each of the terminal stations 21 and 22 for use in packet transmission. The packet transmitting section 114 transmits a packet reporting the band allocated by the band allocating section 113 to each of the terminal stations 21 and 22.

In each of the terminal stations 21 and 22, the packet receiving section 211 receives packets transmitted from the other terminal station and the control station 11. The buffer section 212 is a transmission buffer for temporarily storing data received from another component or an external device. The transmission information generating section 213 generates transmission information for specifying the amount of data that remains in the buffer section 212, such as the amount of packet data or the number of packets. The packet transmitting section 214 obtains data having a predetermined amount from the buffer section 212, generates a packet by adding the transmission information generated by the transmission information generating section 213 to the obtained data having the predetermined amount, and then transmits the packet to the other terminal station.

FIG. 3 depicts an example of the structure of a packet transmitted and received between the terminal stations. In FIG. 3, the packet includes a physical layer header, a packet type, a recipient address, an originator address, a link identification, a priority, transmission information, a transmission data length, option data, FCS, transmission data, FCS, and a guard. The packet having the structure shown in FIG. 3 requires a band equivalent to 2 Mbps for transmission.

Figure 4:
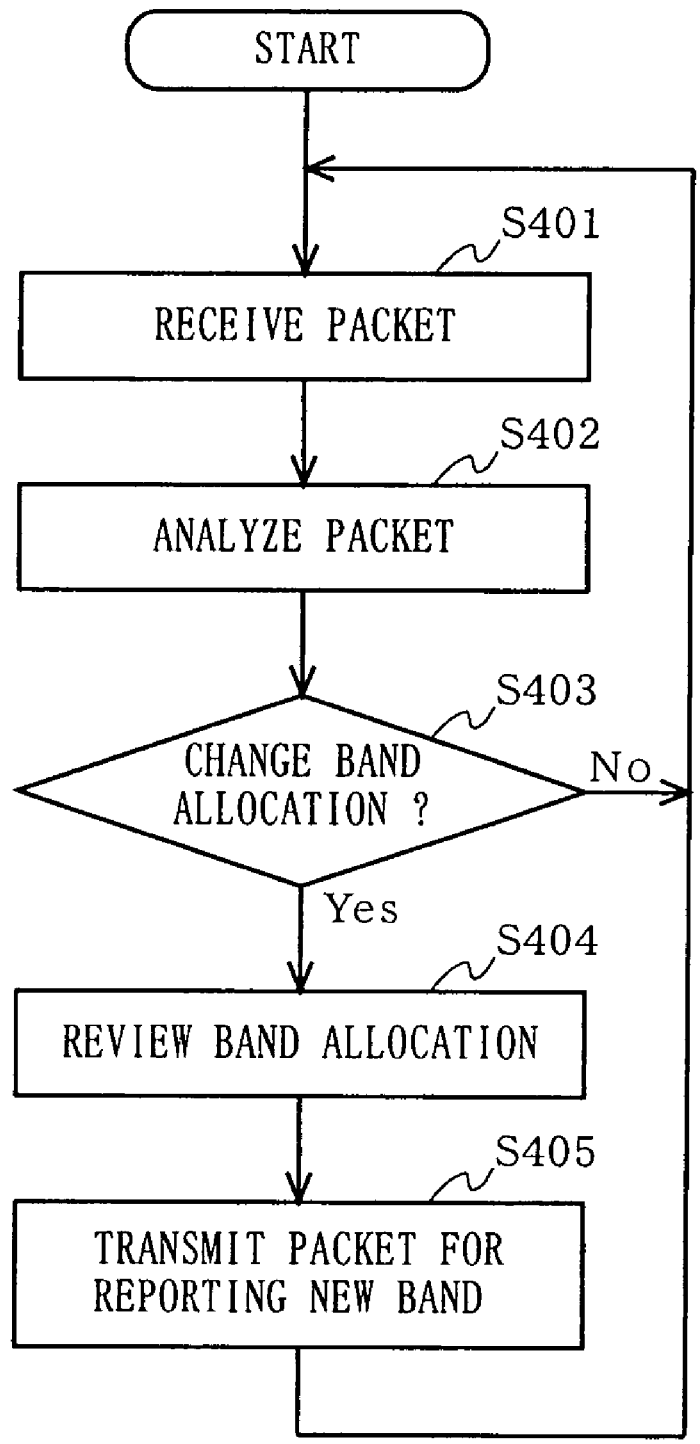
FIG. 4 is a flowchart for describing a general outline of the procedure performed by a control station 11.
Figures 5, 6:
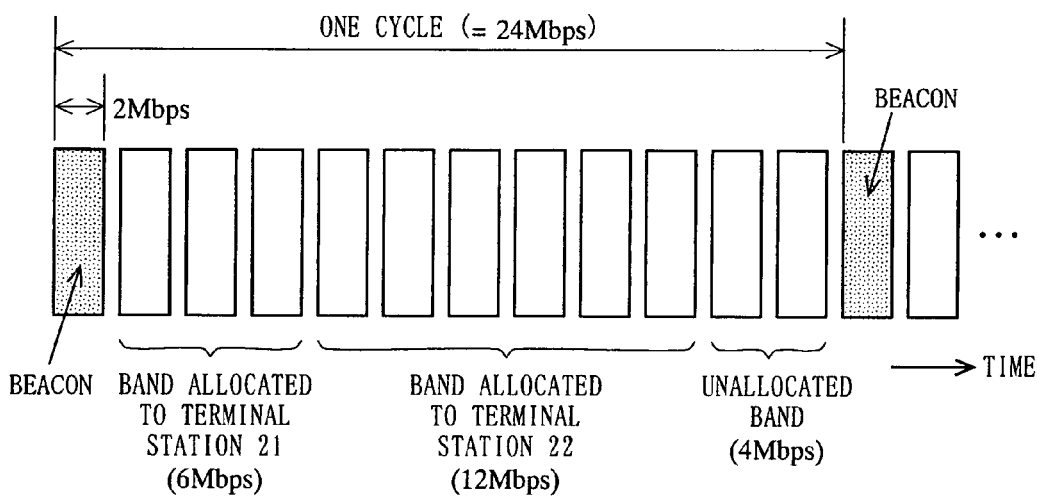
FIG. 5 is an illustration showing one example of band allocation of terminal stations 21 and 22.
FIG. 6 is an illustration showing one example of transmission information stored in the control station 11.

Next, a control method performed by the access control system according to the first embodiment of the present invention is described below. FIG. 4 is a flowchart schematically showing the procedure performed by the control station 11. Note that description is made to an exemplary case where a total transmission rate useable for communication in the network is 24 Mbps. Also, in this case, it is assumed the terminal station 21 requires a transmission band whose average transmission rate is 6 Mbps for transmitting a packet to the terminal station 22, and the terminal station 22 requires a transmission band whose average transmission rate is 12 Mbps for transmitting a packet to the terminal station 21. It is also assumed that these transmission bands are set as defaults by performing negotiation in advance between the control station 11 and the terminal stations 21 and 22 before actual packet transmission is performed. In the initial state, bands (minimum-guaranteed times) are allocated to the terminal stations 21 and 22 as shown in FIG. 5. In FIG. 5, it is assumed that transmission is performed at 24 Mbps in one cycle (10 msec), and this 24 Mbps is divided by 2 Mbps (data of 2500 bytes) into twelve bands.

In the terminal station 21, upon reception of a packet reporting band allocation transmitted by the control station 11, the packet receiving section 211 outputs a reception result indicative of the presence or absence of a packet error and a allocation report to the packet transmitting section 214. Data externally supplied is stored in the buffer section 212. The buffer section 212 outputs the amount of data stored to the transmission information generating section 213. Based on this amount of data, the transmission information generating section 213 generates predetermined transmission information for output to the packet transmitting section 214. If the reception result indicates no packet error and a timing allocated by the allocation report is detected, the packet transmitting section 214 generates a packet including the data and the transmission information and then transmits the generated packet to the terminal station 22. At this time, the data contained in the generated packet is not released from the buffer section 212 until instructed.

On the other hand, in the terminal station 22, the packet receiving section 211 receives the packet transmitted from the terminal station 21 and, if the packet does not have an error, outputs the data to the outside and a reception result to the packet transmitting section 214. Based on the reception result from the packet receiving section 211, the packet transmitting section 214 transmits a response packet to the terminal station 21.

In the terminal station 21, upon reception of the response packet transmitted from the terminal station 22, the packet receiving section 211 instructs the buffer section 212 to release the data.

Packet transmission from the terminal station 22 to the terminal station 21 is performed in a manner similar to the above.

While the terminal stations 21 and 22 are communicating with each other, the control station 11 always monitors each packet transmitted by these terminal stations, that is, receives each packet through the packet receiving section 111 (step S401). The transmission information obtaining section 112 of the control station 11 analyzes the packet received by the packet receiving section 111 to obtain the transmission information (step S402) This obtained transmission information is stored in the table shown in FIG. 6 together with its priority, with its recipient address, originator address, and link type being taken as indexes, for example. With the use of the FCS of the packet, the transmission information obtaining section 112 then performs a packet check from the packet type through the option data of the packet to determine whether an error is present. Note that, in the control station 11, the transmission data portion is not required, and therefore is discarded. Then, based on the obtained transmission information (and the priority as required), the transmission information obtaining section 112 determines whether the band currently allocated is to be changed or not (step S403). If a change is required, band allocation is reviewed, and then a packet for reporting a new band after review is generated for transmission to the terminal stations 21 and 22 (steps S404 and S405).

Figures 7, 8:
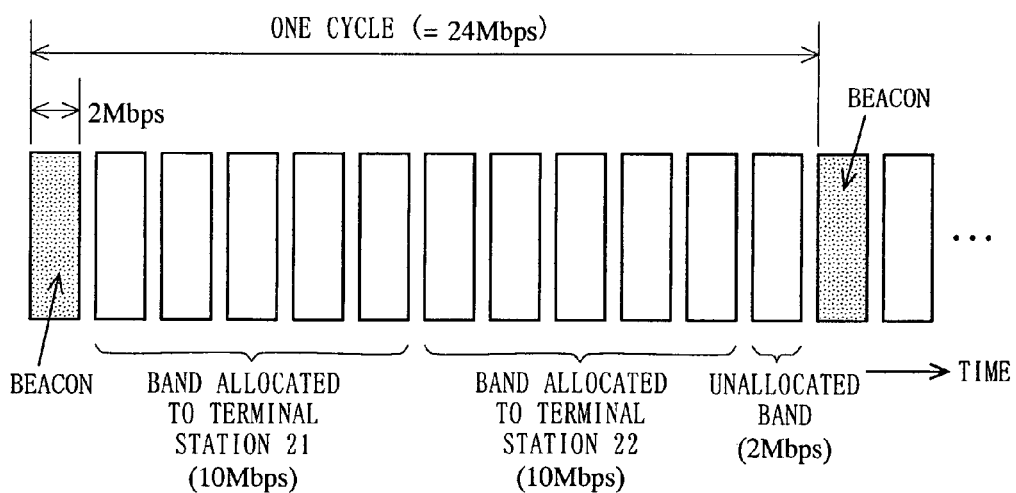
FIG. 7 is an illustration showing a relation between a requested rate and an amount of data in the example of FIG. 5.
FIG. 8 is an illustration showing one example of band allocation of terminal stations 21 and 22.

A specific example of the above control scheme is described below. Here, it is assumed that the above-described packet transmission has been performed several times, thereby causing the amount of data stored in the buffer section 212 of the terminal station 21 to increase to 12000 bytes under the influence of, for example, retransmission required due to data errors and the amount of data stored in the buffer section 212 of the terminal station 22 to decrease to 12000 bytes under the influence of, for example, fluctuations in input data. As described with reference to FIG. 5, the band allocated to the terminal station 21 in the initial setting is 6 Mbps. That is, the amount of transmission data per one cycle is 7500 bytes (refer to FIG. 7). Therefore, the band is short of 4500 bytes (=12000–7500). On the other hand, the band allocated to the terminal station 22 in the initial setting is 12 Mbps. That is, the amount of transmission data per one cycle is 15000 (FIG. 7). Therefore, the band has an excess of 3000 bytes (=15000–12000).

Based on this analysis, the control station 11 increases the allocation to the terminal station 21 by two bands (5000 bytes) to 10 Mbps, while decreasing the allocation to the terminal station 22 by 1 band (2500 bytes) to 10 Mbps. Each band after this allocation change is as shown in FIG. 8.

However, the band shortage is not always covered by a free band or an excess band (hereinafter, an extra-band). In such cases, the extra-band may be equally allocated to each band. Alternatively, the extra-band may be allocated at a ratio at the initial setting. Still alternatively, the extra-band may be allocated according to the degree of priority. In one specific example of a scheme of allocating the extra-band according to the degree of priority, a time is calculated for each link by multiplying the transmission information of the data packet by a time-converted packet length, and a ratio of each calculated time with respect to the total time is further calculated. In another example, from each time calculated as above, a minimum guaranteed time is subtracted, and then a ratio of each time is further calculated (if the calculated ratio has a negative value, the calculated ratio is taken as "0"). According to the calculated ratios, allocation of the extra-band or the entire communication band is determined. Furthermore, in accordance with the priority shown in FIG. 3, a constant may be added to the value of the ratio or the value of the ratio may be multiplied by a constant.

As described above, according to the access control system of the first embodiment of the present invention, each terminal station transmits its transmission data added with transmission information indicative of the degree of the amount of data stored in the buffer, and the control station analyzes the transmission information to control the band allocation to each terminal. With this, the band can be allocated in accordance with the retransmission process or fluctuations in traffic.

In the above embodiment, band calculation is performed in the units of bytes. Alternatively, band calculation may be performed in the units of the number of packets or the number of buffers. Also, the control station 11 may have a data communication function as the terminal stations 21 and 22.

Furthermore, a scheme, such as discrete multi-tone (DMT), may be used in which the data portion of the packet can be received only by a specific terminal. In this case, the transmission information obtaining section may use a scheme, such as a modulation-demodulation scheme or an error correction scheme, in which all terminal stations can receive the data portion, and the scheme may be stricter than that applied to the data portion.

Second Embodiment

In the above first embodiment, system access control is performed by completely separating the terminal stations for data communication from the control station for managing band allocation of the terminal stations. In a second embodiment, an access control system is described in which all of the terminal stations and the control station perform data transmission.

Figure 9:
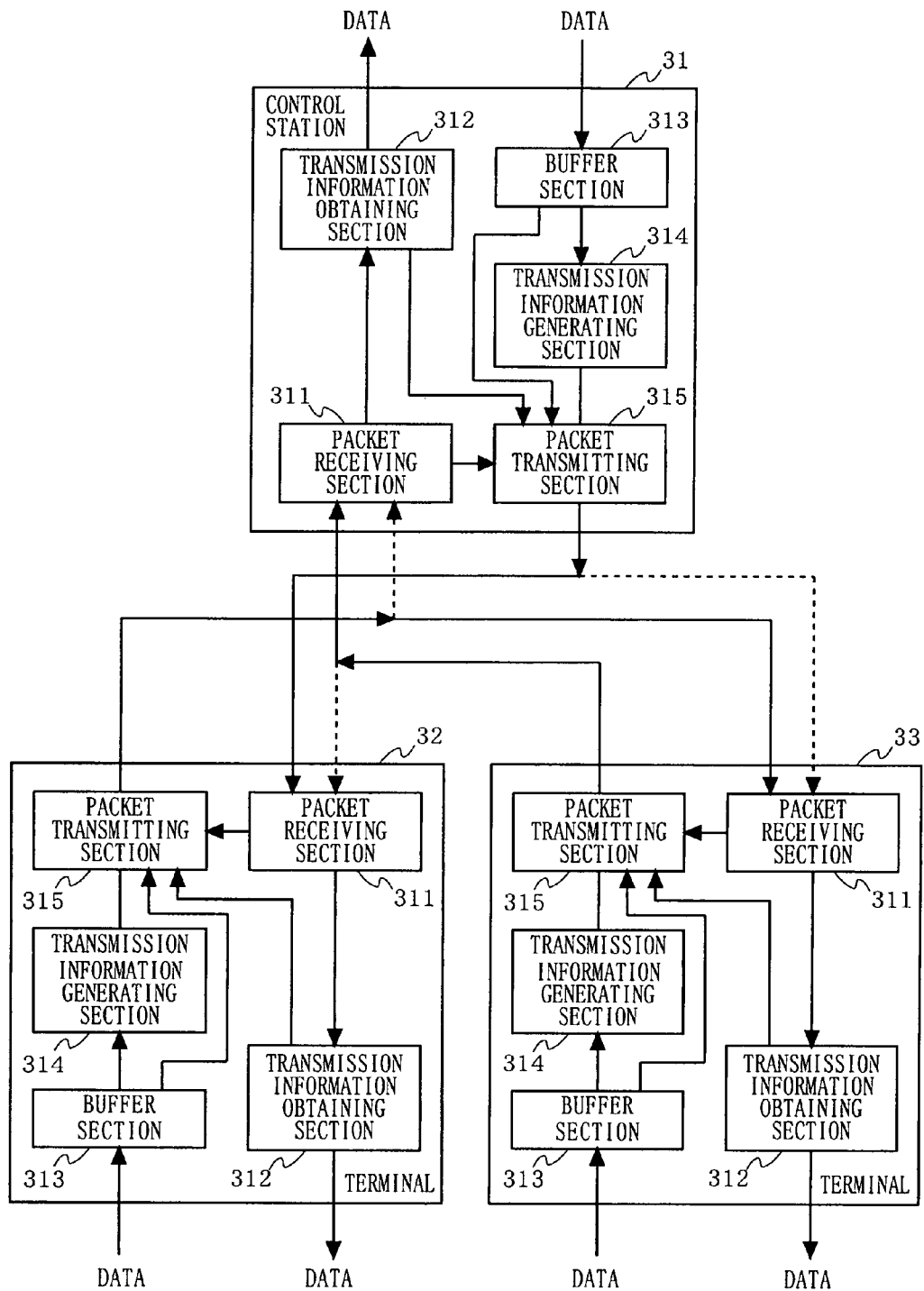
FIG. 9 is a detailed functional block diagram illustrating communication terminals forming an access control system according to a second embodiment of the present invention.

FIG. 9 is a detailed functional block diagram illustrating communication terminals forming an access control system according to the second embodiment of the present invention. In FIG. 9, communication terminals 31 through 33 are identical in structure, each including a packet receiving section 311, a transmission information obtaining section 312, a buffer section 313, a transmission information generating section 314, and a packet transmitting section 315. In FIG. 9, the number of communication terminals are exemplarily three.

First, the structure of each of the communication terminals 31 through 33 is schematically described below.

The packet receiving section 311 receives a packet (which is equivalent to a frame) from another communication terminal. The transmission information obtaining section 312 obtains transmission information from the packet received by the packet receiving section 311 and, if no error is found in the packet, then outputs the data to the outside. Based on the obtained transmission information, the transmission information obtaining section 312 determines a packet transmission timing of its own communication terminal to control the packet transmission section 315. The buffer section 313 is a transmission buffer for temporarily storing data received from another component or an external device. The transmission information generating section 314 generates transmission information for specifying the amount of data that remains in the buffer section 313. Under the control of the transmission information obtaining section 312, the packet transmitting section 315 obtains data having a predetermined amount from the buffer section 313, generates a packet by adding the transmission information generated by the transmission information generating section 314 to the obtained data, and then transmits the packet to another communication terminal.

Next, a control method performed by the access control system according to the second embodiment of the present invention is described below. It is assumed herein that communication links have been established from the communication terminal 31 to the communication terminal 32, from the communication terminal 32 to the communication terminal 33, and from the communication terminal 33 to the communication terminal 31. In this case, the amounts of data indicated by the transmission information generated in the communication terminals 31, 32, and 33 are 10000 bytes, 5000 bytes, and 15000 bytes, respectively. That is, the total band required in the entire system is 30000 (=10000+5000+15000).

The communication terminal 31 confirms from the transmission information received from the communication terminals 32 and 33 that a ratio of the amount of data stored in its own buffer section 313 with respect to the amount of data in the entire system is 1/3 (=10000/30000). Upon confirmation of this ratio, the communication terminal 31 sets a threshold as 0.33, and then generates a random number in a range of 0 to 1 at predetermined time intervals to control so that data transmission is performed only when the random number is equal to or smaller than the threshold of 0.33.

Similarly, the communication terminal 32 confirms, based on the transmission information received from the communication terminals 31 and 33, that a ratio of the amount of data stored in its own buffer section 313 with respect to the amount of data in the entire system is 1/6 (=5000/30000). Upon confirmation of this ratio, the communication terminal 32 sets a threshold as 0.17, and then generates a random number in a range of 0 to 1 at predetermined time intervals to control so that data transmission is performed only when the random number is equal to or smaller than the threshold of 0.17. Furthermore, the communication terminal 33 confirms from the transmission information received from the communication terminals 31 and 32 that a ratio of the amount of data stored in its own buffer section 313 with respect to the amount of data in the entire system is 1/2 (=15000/30000). Upon confirmation of this ratio, the communication terminal 33 sets a threshold as 0.5, and then generates a random number in a range of 0 to 1 at predetermined time intervals to control so that data transmission is performed only when the random number is equal to or smaller than the threshold of 0.5.

With this process, the frequency of transmission performed by the communication terminals 31 through 33 can be controlled to 1/3, 1/6, and 1/2, respectively, in proportion to the amount of data stored in the buffer section 313.

The threshold and the random number may be treated after being subjected to scaling. Also, if priorities are set to the communication links, a parameter for giving a weight to the threshold value and the random number may be provided to each priority. For example, parameters 0.5, 1, and 2 are set to priorities of 1, 2, and 3, respectively. In this case, if the communication link of the communication terminal 31 has a priority of 3, the communication link of the communication terminal 32 has a priority of 2, and the communication link of the communication terminal 33 has a priority of 1, each amount of data is multiplied by the parameter, thereby obtaining 20000 (=10000×2) for the communication terminal 31, 5000 (=5000×1) for the communication terminal 32, and 7500 (=15000×0.5) for the communication terminal 33. Therefore, the total band required in the entire system is 32500 bytes (=20000+5000+7500).

Consequently, after calculation in the above-described manner, the ratio of the amount of data for the communication terminal 31 is 8/13 (=20000/32500), and its threshold is 0.62. The ratio of the amount of data for the communication terminal 32 is 2/13 (=5000/32500), and its threshold is 0.15. The ratio of the amount of data for the communication terminal 33 is 3/13 (=7500/32500), and its threshold value is 0.23.

In some cases, if an error rate of packet transmission in a communication link is abnormally high, the amount of data in the buffer section 313 of a terminal performing communication through that communication like may be abnormally large. In such cases, setting a high threshold to that link will degrade throughput in the entire network. To prevent this problem, when the amount of data is larger than a predetermined amount, the amount of data may be converted to 0 or a predetermined small value for calculation of the ratio. With this, a high threshold is prevented from being set to the communication link having a large amount of packet transmission errors.

As described above, according to the access control system of the second embodiment of the present invention, each communication terminal transmits its transmission data added with transmission information indicative of the degree of the amount of data stored in the buffer, and each communication terminal analyzes the transmission information to control the frequency of transmission (that is, the band allocation) of its own communication terminal. With this, the band can be allocated in accordance with the retransmission process and fluctuations in traffic. Furthermore, the communication band can be efficiently used by avoiding band congestion.

Each of the above-described embodiments is achieved by a CPU interpreting predetermined program data that is stored in a storage device (a ROM, a RAM, a hard disk, etc.) and is capable of causing the above-described processes to be performed. In this case, the program data may be introduced through a recording medium to the storage device, or may be executed directly from the recording medium. The recording medium may be a semiconductor memory, such as a ROM, a RAM, and a flash memory, a magnetic disk memory, such as a flexible disk or a hard disk, an optical disk memory, such as a CD-ROM, a DVD, or a BD, or a memory card. Also, the program may be transmitted using a communication medium, such as a telephone line or a carrier path.

Also, all or part of the functional blocks forming each of the communication terminals of the present invention are typically achieved by a large-scale integrated (LSI) circuit (called an IC, a system LSI, a super LSI, a ultra LSI, or the like, depending on the degree of integration). Each of the blocks may be formed on one chip, or all or part of the blocks may be formed on one chip.

Also, circuit integration is achieved not only by an LSI but also by a dedicated circuit or a general-purpose processor. Further, a Field Programmable Gate Array (FPGA), which is programmable after manufacturing the LSI, or a reconfigurable processor capable of reconfiguring the connection of circuit cells and the setting inside the LSI can be used.

Furthermore, integration of the functional blocks can be performed by using a new circuit integration technology that would replace the LSI technology with the advance of the semiconductor technology or with the advent of another derivative technology. One possible technology that would be adapted for use is a biotechnological technique.

Figure 10:
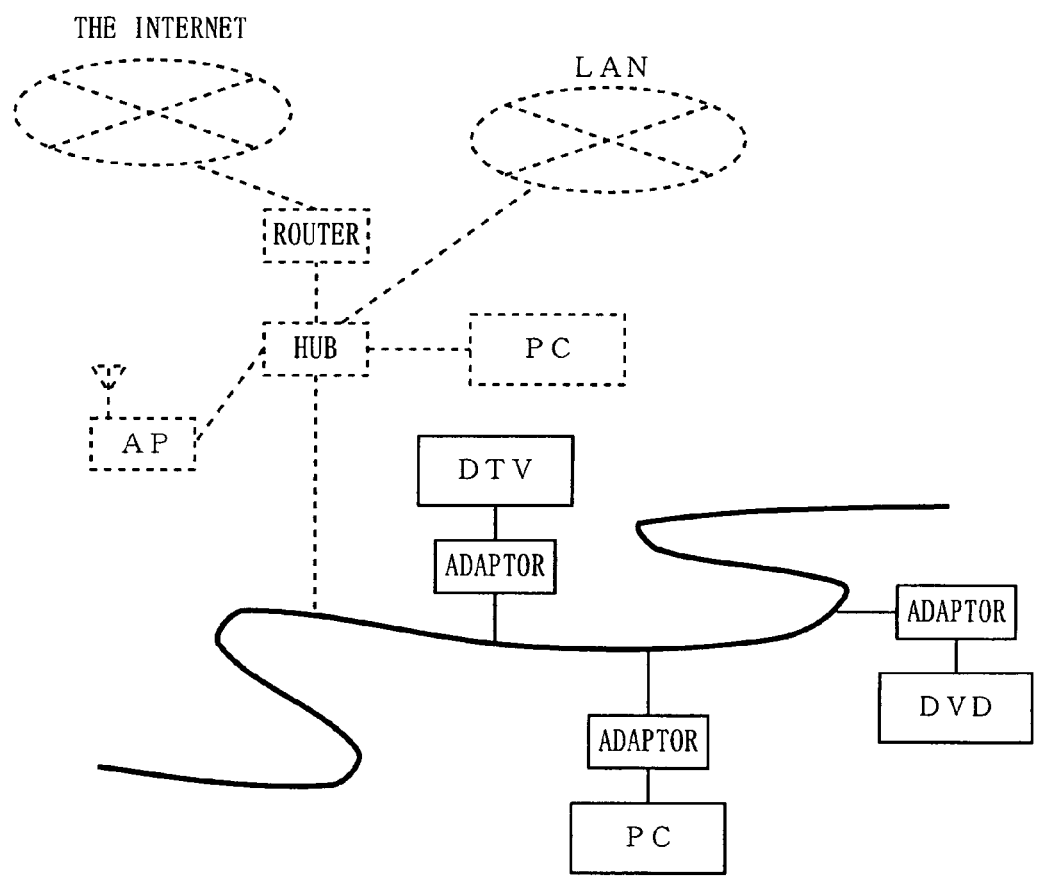
FIG. 10 is an illustration showing one example of a network system in which the access control system of the present invention is applied to high-speed power line transmission.

Description is made below to an example in which the present invention described in each of the above embodiments is applied to an actual network system. FIG. 10 is an illustration showing one example of a network system in which the medium access control system of the present invention is applied to high-speed power line transmission. In FIG. 10, via adaptors including the functional modules of the present invention, IEEE 1394 interfaces and USB interfaces included in multimedia devices, such as personal computers, DVD recorders, digital televisions, and home server systems, are connected to a power line. This makes it possible to configure a network system capable of high-speed transmission of digital data, such as multimedia data, with a power line being used as a medium. Unlike the conventional cable LAN, this system can use the power line already installed at home and offices as a network line without newly installing a network cable. Therefore, this system can be achieved at low cost and with easy installation, thereby offering a great convenience.

In the above example, by interposing an adaptor for converting a signal interface of each of the existing multimedia devices to an interface for power line communication, these existing devices are applied to power line communication. In the future, however, with the functions of the present invention being incorporated in the multimedia devices, data transmission among the devices can be performed via a power supply code of each of the multimedia devices. In this case, no adaptors, IEEE 1394 cables, or USB cables are required, thereby simplifying wiring. Also, connection to the Internet via a router and connection to a wireless/cable LAN using a hub or the like can be made, thereby making it possible to extend a LAN system using the high-speed power line transmission system of the present invention. Furthermore, in the power line transmission scheme, the communication data flows via the power line. Therefore, it is possible to prevent the problem of interception of radio waves which would lead to leakage of data. This power line transmission scheme is also effective for data protection in view of security. As a matter of course, data flowing through the power line is protected by, for example, IPsec in the IP protocol, encryption of the contents, other DRM schemes, etc.

As has been described above, by implementing QoS functions including a copyright protecting function achieved by encryption of the contents and the effects of the present invention (improvement in throughput and flexible adaptation of band allocation responsive to an increase in re-transmission or a traffic change), high-quality transmission of AV contents using the power line can be performed.

While the invention has been described in detail, the foregoing description is in all aspects illustrative and not restrictive. It is understood that numerous other modifications and variations can be devised without departing from the scope of the invention.

What is claimed is:

1. An access control method for accessing a network, said access control method being for use in a communication network system including a plurality of communication terminals, said access control method comprising:
   steps performed by a communication terminal that is to transmit data, the steps comprising:
      generating a transmission packet including transmission information, the transmission information indicating an amount of data remaining in a transmission buffer; and
      transmitting the generated transmission packet over the network,
   wherein the generated transmission packet includes transmission data and transmission data length, the transmission data including data from the transmission buffer and the transmission data length indicating a length of the transmission data.

2. The access control method according to claim 1, wherein the transmission information includes information regarding an amount of packet data remaining in the transmission buffer.

3. The access control method according to claim 1, wherein the transmission information includes information regarding a total number of packets remaining in the transmission buffer.

4. The access control method according to claim 1, wherein the amount of data is converted to 0 or a predetermined small value, when the amount of data is larger than a predetermined amount.

5. A communication terminal for controlling access to a network by a plurality of communication terminals which transmit over the network, said communication terminal comprising:
   a transmission buffer for temporarily storing data;
   a transmission information generating section for generating transmission information indicating an amount of data remaining in the transmission buffer; and
   a packet transmitting section for generating a transmission packet including the transmission information, and for transmitting the generated transmission packet to another communication terminal of the plurality of communication terminals,
   wherein the generated transmission packet includes transmission data and transmission data length, the transmission data including data from the transmission buffer and the transmission data length indicating a length of the transmission data.

6. A non-transitory computer-readable recording medium having a computer program recorded thereon, the computer program for use in a communication network system including a plurality of communication terminals, the computer program causing a communication terminal of the plurality of communication terminals that is to transmit data to execute a method comprising:
   generating a transmission packet including transmission information, the transmission information indicating an amount of data remaining in a transmission buffer; and
   transmitting the generated transmission packet including the transmission information over the network,
   wherein the generated transmission packet includes transmission data and transmission data length, the transmission data including data from the transmission buffer and the transmission data length indicating a length of the transmission data.

* * * * *